United States Patent [19]

Erion

[11] 4,332,413
[45] Jun. 1, 1982

[54] WINDOW ASSEMBLY

[75] Inventor: Jeffrey A. Erion, Plymouth, Mich.

[73] Assignee: Ford Motor Company, Dearborn, Mich.

[21] Appl. No.: 178,649

[22] Filed: Aug. 15, 1980

[51] Int. Cl.³ .............................................. B60J 1/02
[52] U.S. Cl. .................................. 296/84 R; 160/371;
296/146
[58] Field of Search ................... 296/84 R, 84 C, 146, 296/31 P; 160/371

[56] References Cited

U.S. PATENT DOCUMENTS

| 2,606,635 | 8/1952 | Clingman | 296/84 R |
| 2,610,714 | 9/1952 | Bradley | 296/84 R |
| 3,764,178 | 10/1973 | Krings | 296/84 R |
| 3,776,591 | 12/1973 | Krueger | 296/146 |
| 3,948,430 | 4/1976 | Koike | 296/146 |
| 4,072,340 | 2/1978 | Morgan | 296/84 R |
| 4,139,234 | 2/1979 | Morgan | 296/84 R |
| 4,261,610 | 4/1981 | Inamoto | 296/84 R |

Primary Examiner—Joseph F. Peters, Jr.
Assistant Examiner—John A. Carroll
Attorney, Agent, or Firm—J. J. Roethel; C. L. Sadler

[57] ABSTRACT

A window assembly for modifying the appearance of a vehicle body. The window assembly comprises a glass fiber reinforced polyester panel adapted to bridge a body opening. The polyester panel has at least one opening smaller and of a different configuration than the body opening and is formed with a peripheral rabbet projecting into the smaller opening. An insert complementary in shape to the smaller opening is positioned in the latter adjacent the rabbeted periphery. The insert may take the form of a window pane, a louvered panel, a lamp housing lens, or other substantially planar article. The insert is held in place by an injection moldable elastomeric material that in cured condition integrally interlocks the periphery of the insert to the rabbet of the polyester panel.

4 Claims, 7 Drawing Figures

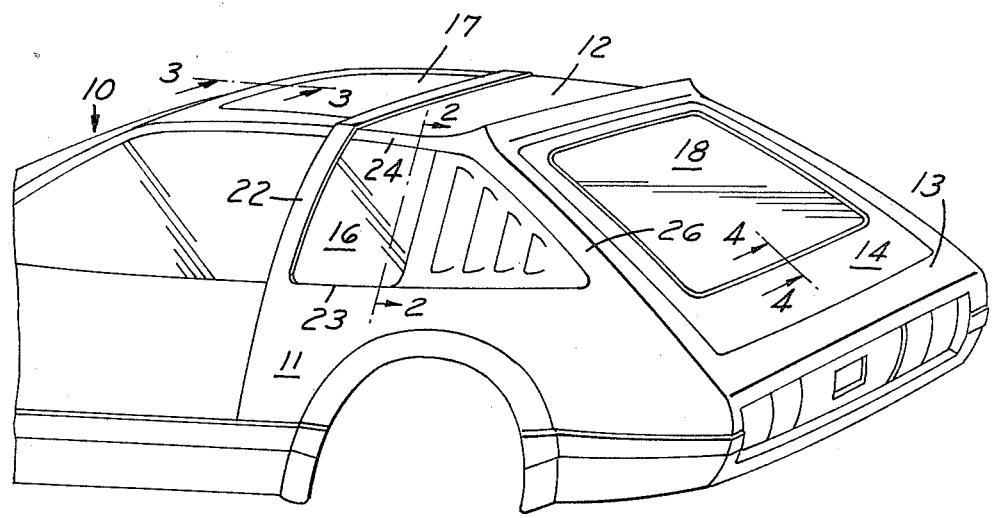
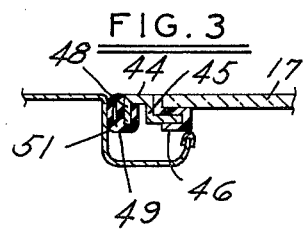
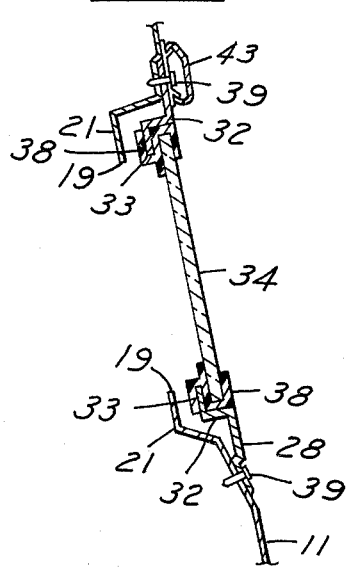
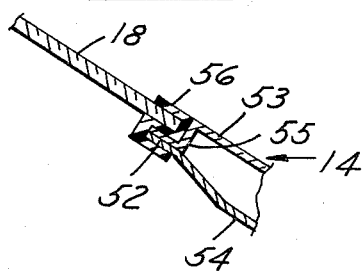

WINDOW ASSEMBLY

BACKGROUND OF THE INVENTION

U.S. Pat. Nos. 4,072,340 and 4,139,234, issued to C. Morgan for "Window Assembly", both disclose a vehicular window assembly formed as a complete unit prior to installation in a vehicle body. The installation is from the exterior of the vehicle body with only final securement of attachment devices from the interior of the vehicle body being required. The window assembly as disclosed in the patents basically must conform to the shape of the aperture or window opening in the vehicle body panel on which it is to be installed. Most motor vehicle manufacturers use a body shell assembly wholly or in part from common body panels for a series of models or body styles. In order to obtain different window area configurations, such as in the rear quarter side panel area illustrated in the patents, the stamping and forming dies for the panels must be different or modifiable for each vehicle model, thus adding to the manufacturing costs.

The present invention provides window assemblies that may be varied from model to model, while being readily installable as a unit on basic vehicle body panels or body shells having a standardized aperture or window opening.

SUMMARY OF THE INVENTION

The present invention relates to a vehicle window assembly for modifying the appearance of a vehicle body so that common body panels may be utilized in the manufacture of vehicles having distinctive styling features. The window assembly comprises a glass fiber reinforced, substantially opaque, polyester panel adapted to bridge a vehicle body aperture, such as the window opening in a rear quarter vehicle body side panel. The polyester panel has one or more openings that are smaller and of a different configuration than the body opening. The panel is formed with a peripheral rabbet that projects into the smaller opening.

An insert, such as a window pane, a louvered panel, a lamp housing lens, or other substantially planar article that is complementary in shape to the smaller opening, is inserted into the smaller opening and is positioned adjacent the rabbeted edge of the latter. The insert is held in place by an injection moldable elastomeric material that in cured condition integrally interlocks the periphery of the insert to the rabbet of the polyester panel.

DESCRIPTION OF THE DRAWINGS

Other objects, advantages and features of the present invention will become more apparent as the description proceeds, reference being had to the accompanying drawings, wherein:

FIG. 1 is a partial view of an automobile body illustrating the areas of the body having window panels or the like to which features of the present invention may be adaptable;

FIGS. 2, 3 and 4 are sectional view taken along the lines 2—2, 3—3 and 4—4 of FIG. 1;

DETAILED DESCRIPTION OF THE INVENTION

Figure 5:
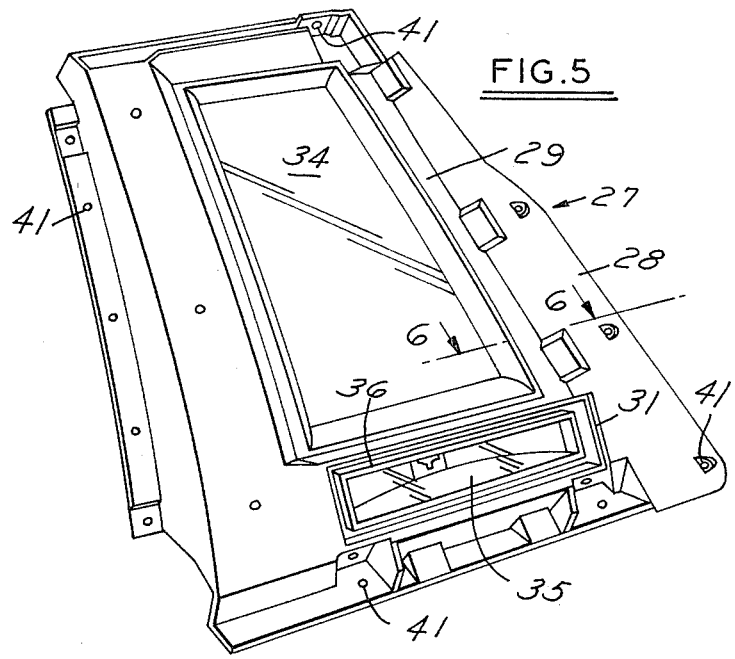
FIG. 5 illustrates a preferred window assembly embodiment applicable to a vehicle body rear quarter side panel.

Referring now to the drawings, there is illustrated a portion of a vehicle body structure, generally designated 10. The vehicle body is fabricated of a number of panels, such as rear quarter panels 11, a roof panel 12, a rear body panel 13, which may be apertured to receive a rear door 14, which may itself comprise a panel 15. The rear quarter side panels 11, the roof panel 13 and the rear door panel 15 may be preformed with apertures or window openings to receive, respectively, a quarter window 16, a roof window 17 and a rear window 18 mounted in the door 14.

Figure 6:
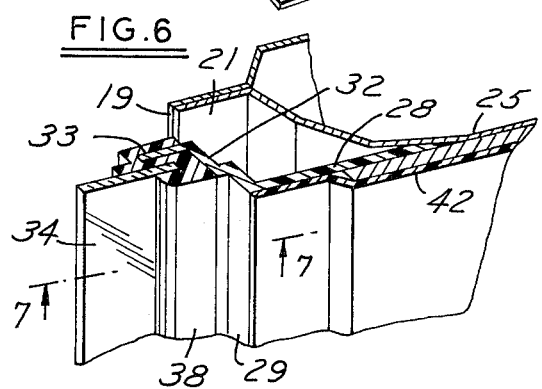
FIG. 6 is a sectional view on the line 6—6 of FIG. 5.
Figure 7:
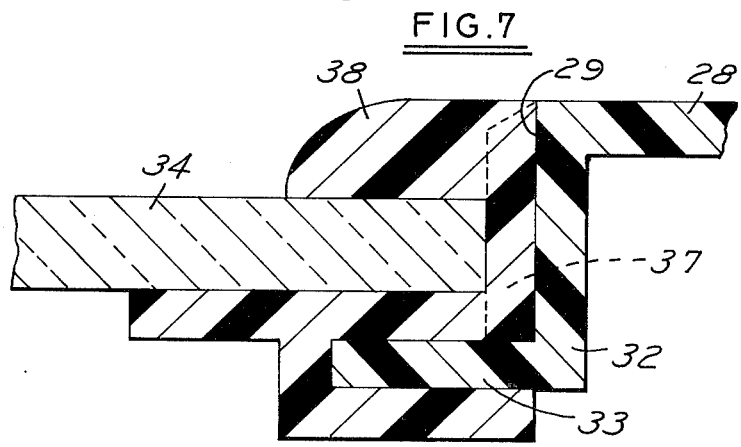
FIG. 7 is an enlarged sectional view taken on the line 7—7 of FIG. 6.

Referring now more particularly to FIGS. 5 to 7, inclusive, there is illustrated a preferred embodiment of a window assembly for a vehicle body rear quarter panel 11. As indicated in the Background statement of this patent specification, the vehicle body rear quarter panel 11 preferably is a standardized panel fabrication adapted to be a part of a vehicle body shell to be used in more than one car line produced by the vehicle manufacture or in more than one model of the same car line. The panel has a standardized aperture or window opening, the edge 19 of which is the edge of a pinch weld flange 21 of the quarter panel 11 structure. It will be understood that the pinch weld flange 21 usually extends around the entire aperture or window opening. In the body structure 10, the pinch weld flange 21 in effect projects inwardly into the aperture or window opening as an extension of the "B" pillar 22, the belt line 23, the roof rail 24, and the panel 25 surface extending forwardly of the "C" pillar 26.

In order for a vehicle manufacturer to utilize the same basic body shell for a plurality of vehicle models to be marketed by different automobile dealers, or to provide its dealerships with a lineup of vehicles to be marketed as standard, deluxe, sports, or like versions under the same nameplate, the vehicles must have modified external appearances. One way this can be accomplished in part is by modifying the appearance of the rear quarter panel. The window assembly, generally designated 27, permits this to be accomplished readily without requiring the use of a quarter panel unique to each vehicle in the model lineup.

The window assembly 27 comprises a glass fiber reinforced polyester panel 28 adapted to bridge the aperture or window opening in the standard quarter panel. Preferably, the panel 28 is opaque. The polyester panel has at least one opening 29, or it may have a second opening 31, as shown in FIG. 6. The opening (or each opening) obviously is smaller than the quarter panel aperture or opening. The polyester panel openings are not restricted to the configuration of the quarter panel opening and may be of any desired configuration to provide a distinctive appearance to each of the several vehicle lines.

The opening (or each opening) in the polyester panel is formed with a rabbet 32 extending around the periphery of the opening and having a leg 33 projecting into the opening parallel to the plane of the latter.

An insert, such as a window pane 34 as shown positioned in the polyester panel opening 29, a louvered panel, the lens 35 of a lamp housing 36 as shown in relation to the opening 31, a medallion, or any other planar article that is complementary in shape to either opening 28 or 29, is inserted into the opening adjacent the rabbet thereof. The insert is held in place by an injection moldable material that in cured condition integrally interlocks the periphery of the insert to the adjacent rabbet of the polyester panel.

The operation of joining the window pane 34 to the polyester panel 28 preferably is accomplished in a matched die injection molding machine. The polyester panel 28 is first primed in the rabbet area with a suitable material to facilitate the adhesion of the injection moldable material to the panel. The polyester panel 28 is then loaded into the die. The window pane 34 is then positioned in the open area. The window pane is aligned by ribs 37 (see FIG. 6) around the periphery of the opening 28 and the elastomer 38 is injected around the panel rabbet and the perimeter of the window pane 34. A medium durometer (85±10) elastomer had been found to provide a suitable interfacing agent. At the completion of the molding cycle, the elastomer in cured condition integrally interlocks the periphery of the insert or window pane 34 to a rabbet 32 of the polyester panel 28.

In the case of the quarter window assembly, it is assembled to the quarter panel body side by using rivets or screws 39 inserted through the various holes 41 around the panel 28 perimeter. The panel edges then are covered with an applique 42 and body side moldings 43, as desired.

The window assembly 27 may be depressed into the body side surface or positioned to provide a flush glass mounting, as desired. The choice of adding or deleting the lower opening 31, and thereby any accommodation for the side lamp (housing 36 and lens 35), also permits a change in appearance of the vehicle.

The process for securing the glass pane to a polyester panel or frame is suitable for a variety of fixed glass applications, such as the roof panel 17 as shown in detail in FIG. 3, and window 18 in the rear door or lift gate 14 of FIG. 4.

In FIG. 3, the glass roof panel 17 is shown integrated with a polyester frame 44 having a rabbet 45 with a right angle extension or leg 46 paralleling the plane of the glass. The frame rabbet 45 and the glass panel perimeter are integrally interlocked by an injection moldable elastomer 47 equivalent to the elastomer 38 of the preferred embodiment of the invention illustrated in FIGS. 5 to 7, inclusive. The frame 44 is provided with a right angle leg or peripheral rim 48 adapted to receive an elastomeric weatherstrip 49 of conventional configuration to seal the gap between the roof panel 17 and the roof flange 51 of the vehicle body roof opening.

In FIG. 4, the glass panel 18 is shown integrated with the pinch weld flange 52 of the outer and inner panels 53 and 54 of the rear door 14 of the vehicle body. The pinch weld flange 52 forms one leg of the offset rabbet 55 receiving the panel 18. The interlocking agent, as in the previously described embodiments, is an injection moldable elastomer 56 similar to the elastomer 38 of the FIGS. 5 to 7 preferred embodiment of the invention.

It is to be understood that this invention is not limited to the exact construction illustrated and described above, but that various changes and modifications may be made without departing from the spirit and scope of the invention as defined in the appended claims.

I claim:

1. In combination, a vehicle body panel having an aperture of predetermined size and shape therein; and a window assembly for altering the appearance of the vehicle body panel in the area of the aperture; the window assembly comprising a glass fiber reinforced, substantially opaque, polyester panel contoured for external attachment to the vehicle body panel in position to conceal the aperture; the polyester panel having a plurality of openings of smaller and different configurations than the body aperture and being formed with substantially peripherally extending rabbets around each of its openings; inserts complementary in shape to respective ones of the polyester panel openings positioned in the latter adjacent the rabbet thereof; one of said inserts being a window panel and a second one of said inserts being a lamp housing; and an injection moldable elastomeric material molded around the peripheral edge of each insert in cohesive relationship to the latter and to the polyester panel rabbet adjacent thereto; the elastomeric material integrally interlocking the periphery of each insert to its adjacent rabbet.

2. In combination according to claim 1, in which: the vehicle body panel is a rear quarter side panel; the area of the rear quarter side panel around the aperture being depressed to receive the window assembly so that the plane of the window panel does not extend outwardly of the plane of the rear quarter side panel.

3. In combination according to claim 1, in which: the polyester panel is secured to the vehicle body by mechanical fastening devices.

4. In combination according to claim 3, in which: the mechanical fastening devices are covered by an applique and body side moldings secured to the rear quarter side panel.

* * * * *